April 26, 1949.  W. J. COTTON  2,468,177
METHOD OF AND APPARATUS FOR EFFECTING THE ELECTROCHEMICAL
TRANSFORMATION OF MATERIAL IN THE PRESENCE
OF ANTENNA ELECTRODES
Filed Aug. 17, 1943  3 Sheets-Sheet 1
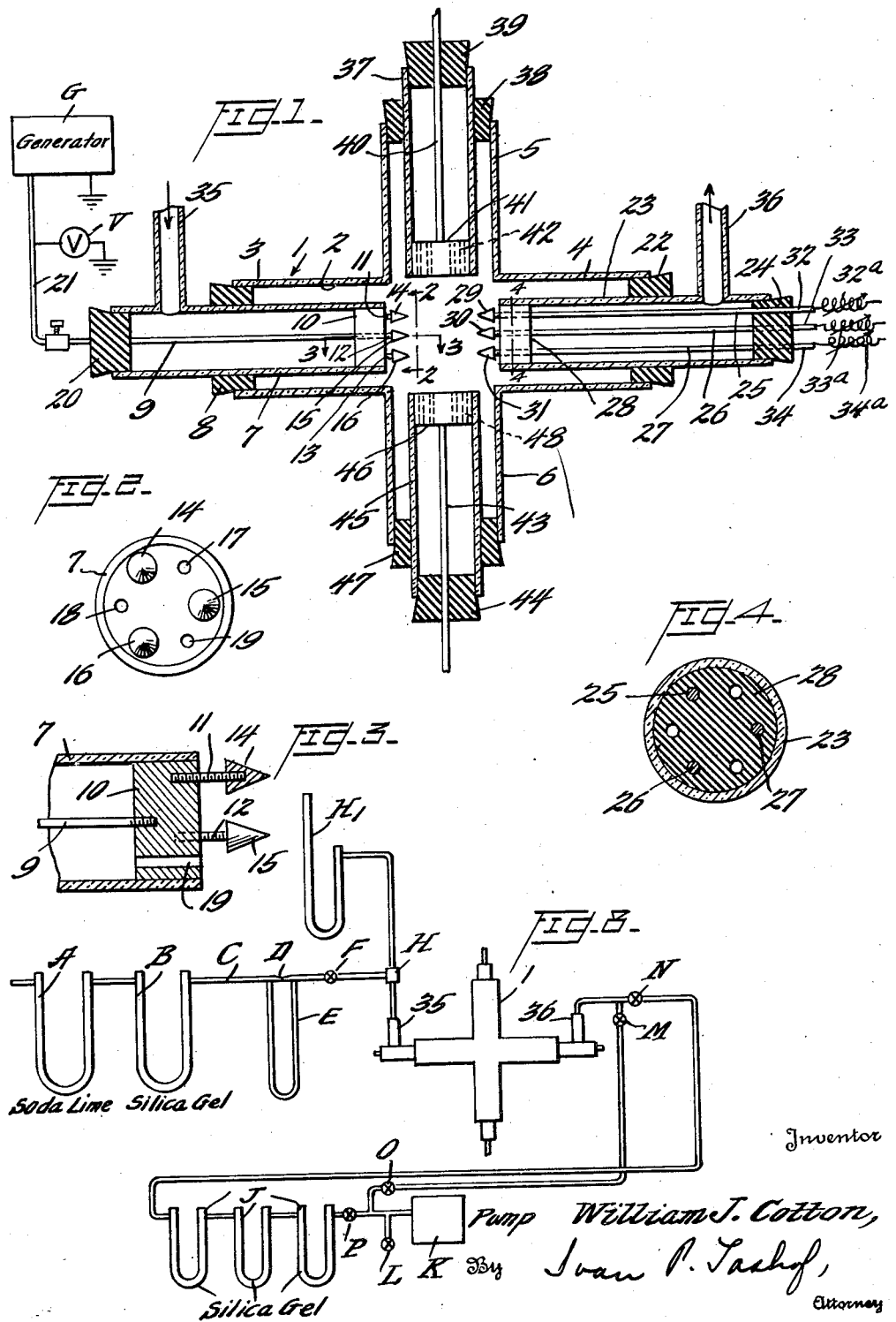

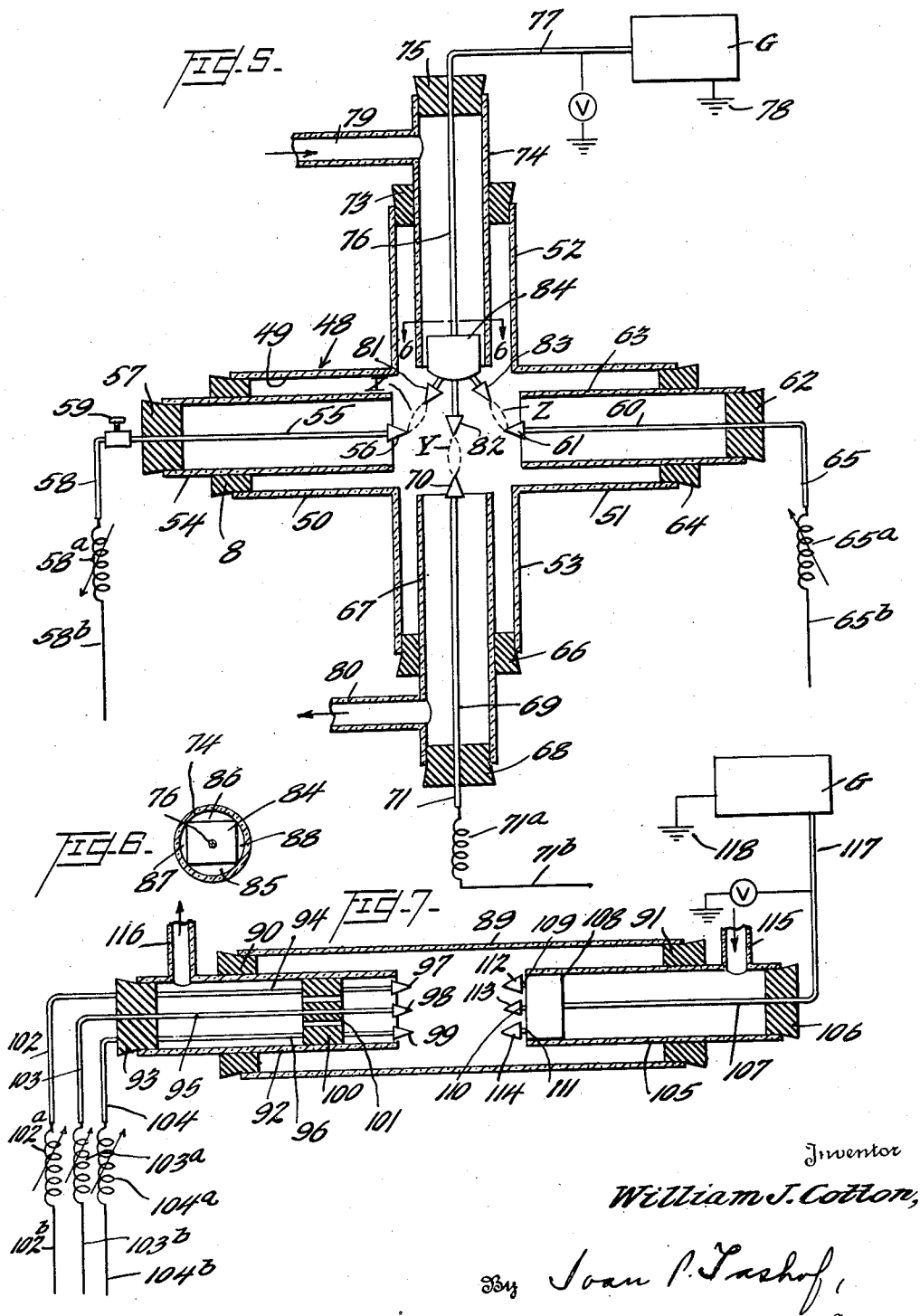

April 26, 1949. W. J. COTTON 2,468,177
METHOD OF AND APPARATUS FOR EFFECTING THE ELECTROCHEMICAL
TRANSFORMATION OF MATERIAL IN THE PRESENCE
OF ANTENNA ELECTRODES
Filed Aug. 17, 1943 3 Sheets—Sheet 3
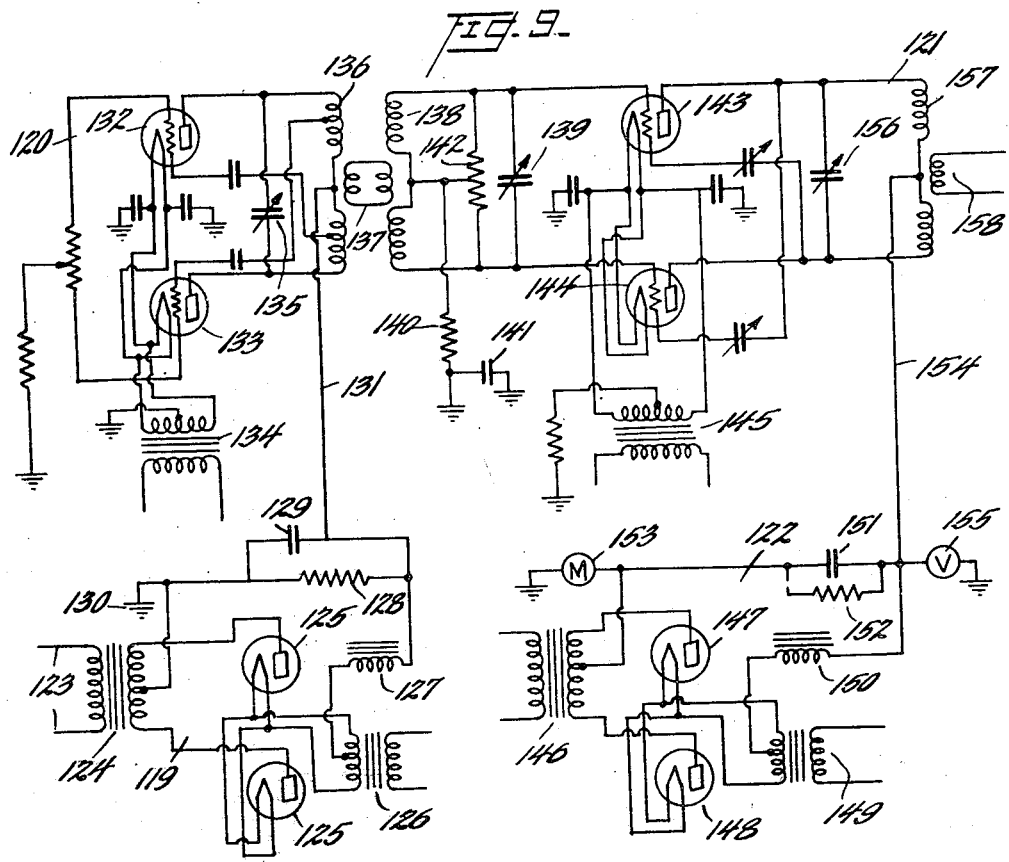
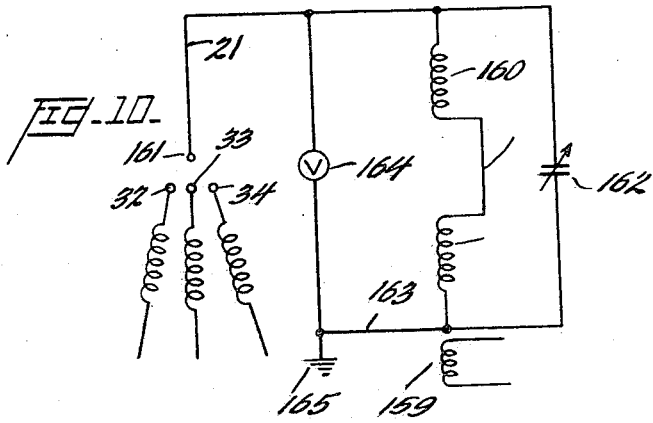
Inventor
William J. Cotton
By Ivan P. Tashof,
Attorney Patented Apr. 26, 1949

2,468,177

UNITED STATES PATENT OFFICE 2,468,177

METHOD OF AND APPARATUS FOR EFFECTING THE ELECTROCHEMICAL TRANSFORMATION OF MATERIAL IN THE PRESENCE OF ANTENNA ELECTRODES

William J. Cotton, Chicora, Pa., assignor, by mesne assignments, to Koppers Company, Inc., a corporation of Delaware Application August 17, 1943, Serial No. 498,999

16 Claims. (Cl. 204—164)

This invention relates to a method of and an apparatus for effecting the electrochemical transformation of gaseous material in an electrochemical reactor in circuit with a source of electrical energy, said electrochemical transformation of the starting material being effected with an increase of chemical efficiency, production capacity of the reactor and the electrical energy transfer efficiency from the source of energy to the reactor.

In accordance with the present invention, the production capacity of a reactor having a single pair of high frequency electrodes, comprising a hot electrode and its corresponding antenna electrodes may be tremendously increased by increasing the number of pairs of high frequency electrodes.

The invention is also directed to improvements wherein the electrical energy supplied to the hot electrode, herein referred to as the "primary electrode," is distributed over a plurality of electrode terminals to thereby increase the working life of the reactor and to simultaneously increase the chemical efficiency of the reactor.

It is therefore the principal object of the present invention to provide an improved method and an improved apparatus whereby electrical energy may be transferred from a source of cyclic electrical energy to a reactor and the discharge zone therein with relatively little loss of electrical energy. More specifically, it is an object of the present invention substantially to increase the electrical energy transfer efficiency of the apparatus herein set forth. It is a further object of the present invention to provide an apparatus for the electrochemical transformation of gaseous material which effects an increase in chemical efficiency and the production capacity of the reactor.

The present invention, in one form, is directed to an electrochemical apparatus for effecting the electrochemical transformation of gaseous material. The apparatus comprises a source of cyclic electrical energy, which may be high frequency energy of the character herein set forth, and a reactor, said reactor comprising means to introduce reacting material and means to remove reaction products therefrom.

The reactor is provided with a hot electrode, which is connected to the source of electrical energy, said electrode being herein designated, for purposes of convenience of description, as the "primary electrode." The primary electrode is provided with a plurality of electrode terminals distributing electrical energy supplied to said primary electrode to thereby increase the working life of the reactor and simultaneously increase the chemical efficiency of the reactor. The reactor is provided with a plurality of secondary reactor electrode terminals cooperating with the primary electrode terminals, and means are also provided to increase the energy transfer from said source of cyclic energy to the reactor to above about 60%; and usually this increase in energy transfer may be as much as 80% to 85%, or even greater. By the expression "means to increase the energy transfer from the source of cyclic energy to the reactor" is meant such means as will produce at the reactor discharge a certain percentage of the cyclic energy produced by the generator.

While it is desirable to increase the energy transfer from the source of cyclic energy to the reactor to at least 80%, the invention in its broad aspect is not limited to an increase of this character, and the principles of the invention may be employed with a much lower increase in electrical energy transfer efficiency.

In one form of the present invention, the primary reactor electrode terminals which are connected to a source of cyclic energy, as, for example, high frequency energy of the character herein set forth, cooperate with a plurality of secondary reactor electrode terminals, each of which are separately connected to a separate antenna in circuit with said source of cyclic electrical energy to thereby insure the transfer of electrical energy from the source of said energy to the reactor with relatively low transfer loss. In one form of the invention, each antenna is conditioned to cause the initiation of a plurality of discharges in said reactor on the passage of cyclic energy, as, for example, high frequency energy of radio or radar frequency, or much lower, through the hot or primary electrode. In another form of the invention, although separate discharges are initiated, these discharges merge together with discharges produced by a crossed discharge to form a single composite discharge volume.

In accordance with the present invention, a reactor of the character above set forth may also have present a separate set of cooperating electrodes or a plurality of sets of cooperating electrodes, each of which generate an electrical discharge crossing the electrical discharge or discharges generated by the said set of hot electrode and antenna electrode terminals which are herein also designated, for the purposes of convenience, as the "primary" and "secondary" electrode terminals.

The advantages resulting from the use of crossed discharges is set forth in copending application Serial No. 546,882, filed July 27, 1944, Electrochemical transformation of gaseous material, a continuation-in-part of application Serial No. 483,931, now abandoned. It is desired to point out that all the advantages resulting from the use of crossed discharges are also obtained when utilizing the method and apparatus herein set forth, whereby not only is there an increase in chemical yield produced by the crossing of the discharges, but simultaneously with this increase in chemical yield there is obtained an increase of production capacity, as hereinafter more fully pointed out.

Further, in the preferred form of the invention, when using crossed discharges, the cyclic energy supplied to the hot electrode is distributed to a plurality of electrode terminals to thereby increase the working life of the reactor, and in this manner simultaneously increase the chemical efficiency of the reactor.

In one form of the invention, the antennas are coupled to inductances, said inductances being of a character to provide the initiation of what may be termed a relatively "fat" discharge. Other equivalent means may be used to tune the antennas so that the circuit of which said antennas are a part will assist in producing a desirable full volume discharge in the reactor on the passage of cyclic energy through the reactor electrodes, either in the presence or without the presence of crossed discharges generated by a separate set of cooperating crossed electrodes.

The reactor herein set forth, in the preferred form of the invention, is in combination with a generator unit including a tank circuit connecting the generator unit to the reactor, said generator unit functioning as a source of cyclic energy. The tank circuit preferably includes a plurality of antennas, each respectively in operative connection with said secondary cooperating electrodes, said tank circuit being tuned to cause the initiation of a plurality of discharges, preferably full volume discharges, in the reactor on the passage of cyclic energy through the hot electrode. In the preferred form of the invention, the reactor of the electrochemical apparatus is provided with a hot electrode which is incapable of oxidation at the temperature present in the reactor. Desirably, it has a melting point of the order of that possessed by tantalum, whereby oxidation of the electrode is inhibited at the temperature present in the reactor.

While it has been stated that the primary or hot electrode terminals are of tantalum or equivalent material, it is within the province of the present invention to have all of the terminals present in the reactor of tantalum or equivalent material, it being pointed out that it has been discovered that columbium, thorium, thoriated tantalum, and thoriated columbium are exceedingly valuable as electrode or electrode terminal materials.

It is within the province of the present invention to supply to the hot or primary electrode cyclic energy, which may be defined as high frequency energy, said energy having a periodicity varying from about 10,000 cycles to about 300,000 mc. This corresponds in wave length from 30,000 meters to 1 mm. or less. The present invention may be carried out by supplying a high frequency current to the hot electrode varying in frequency from about 250,000 cycles, or even 500,000 cycles, to 300,000 mc. or over. As a practical matter, the invention finds its greatest field of usefulness when the electrochemical transformation of materials is effected using high frequency energy of the order of radio frequency or radar frequency.

When the invention is used in a reactor generating crossed discharges, the crossing electrodes may be supplied with low frequency energy, that is, energy varying from 10 cycles to 3,000 mc. or more, but usually within the limits of 25 cycles to 10,000 cycles. In one form of the invention, the two frequencies supplied to the crossed electrodes should differ in numerical value one from the other. The order of the difference, in this preferred, specific form of the invention, is that the crossed frequencies simultaneously acting on a chemical material and electrochemically transforming said material, should produce an increase in chemical yield of the final reaction product over that yield which would be produced using only the particular low frequency of the crossed discharges, or in using only the particular high frequency of the crossed discharges. However, it is to be understood that the frequencies which are crossed in the reactor herein referred to may be of substantially equal frequencies, and highly advantageous results are thus obtained.

The present invention will be illustrated in connection with the accompanying drawing, in which Fig. 1 is a cross-sectional view of a reactor capable of generating crossed discharges of the character herein described, said reactor being provided with low frequency electrodes and with a high frequency electrode connected in the tank circuit of the generator, said reactor also being provided with high frequency antenna electrodes;

Fig. 2 is a cross-sectional view taken on the line 2—2 of Fig. 1;

Fig. 3 is a cross-sectional view taken on the line 3—3 of Fig. 1;

Fig. 4 is a cross-sectional view taken on the line 4—4 of Fig. 1;

Fig. 5 is a cross-sectional view of a reactor in which a plurality of electrodes is provided, one of which is a so-called primary hot electrode directly connected in the tank circuit of a generator, said hot electrode being provided with a plurality of primary electrode terminals, the remaining electrodes functioning as ground electrodes via antenna circuits;

Fig. 6 is a cross-sectional view taken on the line 6—6 of Fig. 5;

Fig. 7 is a cross-sectional view of a modified form of reactor employing a high frequency primary hot electrode and a plurality of secondary antenna electrodes;

Fig. 8 is a diagrammatic representation of an apparatus for drying air prior to its introduction into the reactor and for absorbing the nitric oxide content of the exit reaction gases;

Fig. 9 further sets forth the hook-up of the high frequency generator used in providing the high frequency energy supplied to the tank circuit connecting the generator to the reactor; and Fig. 10 sets forth the tank circuit used in conveying the electrical energy from the generator to the reactor.

Referring to Fig. 1, the reactor unit comprises a reactor vessel 1 having an interior wall 2, said reactor being made of a non-conducting or insulating medium such as a ceramic material, including glass, and preferably a high melting point glass, as exemplified by Pyrex.

The reactor 1 comprises horizontally extending members or legs 3 and 4 and vertically extending members or legs 5 and 6. Positioned within the reactor leg 3 is a sheath member 7 made of glass, said sheath member being mounted in an insulating closure 8. Projecting through the sheath 7 is a brass electrode 9 having mounted on its interior end a seat 10, from which extend three symmetrically arranged stud bolts 11, 12 and 13, on the interior ends of which are screwed electrode tips 14, 15 and 16, made of any desired material, as, for example, of an alloy containing 98% copper and 2% lithium, or equivalent materials hereinafter referred to. The electrode tips are removable, and may be replaced at the termination of their useful life with new tips. The seat member, stud bolts and electrodes may be made of any cheap metallic electrical conductor, as, for example, copper or brass. Seat member 10 carries ports 17, 18 and 19 extending longitudinally of the sheath member 7 to thereby provide means for the passage of gases to the discharge area, to there be reacted. The electrode 9 is mounted in an insulating closure 20 and is connected by means of a thumb screw or the like with a lead 21, which in turn is connected to the generator G by the tank circuit hereinafter set forth. Voltmeter V is included in the tank circuit, being shown in Fig. 1, and also in Fig. 10. The leg member 4 is provided with an insulating end closure 22, in which is mounted sheath member 23, the exterior end of which is provided with an insulating closure 24. Projecting through the closure member 24 and interiorly of the sheath member 23 are the electrodes 25, 26 and 27, made of brass or any similar material. The electrodes pass through an insulating spacer 28, which serves to keep said electrodes electrically separated. Removably mounted on the ends of said electrodes are electrode terminals or tips 29, 30 and 31, said electrode terminals being made of any desired electrode material, as, for example, of a copper lithium alloy containing 98% copper and 2% lithium. Connected to the electrodes 25, 26 and 27 are antennas 32, 33 and 34, which include variable inductances 32a, 33a and 34a respectively, and the latter may be provided with antenna tails. The variable inductances are used to tune each of the antenna electrodes to maximum efficiency.

The leg 3 is provided with an inlet member 35 and leg 4 an outlet member or conduit 36. Positioned within the leg 5, which is preferably diametrically opposite the leg 6, is a sheath member 37 mounted in the leg closure member 38. Passing through the leg member 5 and mounted in the sheath end closure 39 is an electrode 40 provided with a button terminal member 41, which, when hot, preferably fits snugly within the sheath member 37, said button being provided with a plurality of ports 42, so as to adapt said button electrodes to be interchanged with the high frequency electrodes and electrode terminals.

The electrode 43 is mounted in a sheath closure 44 of the sheath member 45, said electrode being provided with a button terminal 46. The leg 6 is closed by the insulating closure member 47. The button may be provided with a plurality of apertures 48, said apertures serving the same purpose as those present in button 41.

The electrode terminals 14, 15, 16 and 29, 30, 31, which are preferably pointed, as this increases the chemical yield of product per kilowatt hour, may consist of any metal or alloy, such, for instance, as nickel, copper, iron, copper-lithium alloy, tantalum, columbium, thoriated tantalum, thoriated columbium, and brass. Carbon electrodes are satisfactory under some conditions. It is broadly within the province of the present invention to substitute for said pointed electrodes buttons, nodules, or globules, or to have electrode terminals in any other shape hitherto used in the treatment or electrochemical transformation of chemical products.

When the electrode terminals are in the shape of sharp-pointed members, the sheath members may be omitted, but it is highly desirable to retain them in order to force the flow of the gaseous medium being subjected to the action of the electrical discharge in and around the electrode tips. Further, it is desired to point out that the sheath members function, to a large extent, to protect the outer vessel from the effect of heat, which may be produced during the course of the reaction in the reactor.

It is preferred that the electrode terminals project beyond the interior ends of the sheath members in order to avoid undue heating of the sheath tubes, said avoidance of undue heating functioning to inhibit the generation of sodium and other undesirable ions which tend to generate side reactions.

The diameter of each of the reactor legs is approximately 32 mm. and the diameter of the sheath members is approximately 23 mm. The overall length of the horizontal members from the exterior end of the leg member 3 to the exterior end of the leg member 4 approximates ten inches, and the vertical members have a like overall length. These dimensions are set forth in an illustrative sense and are not to be taken primarily by way of limitation.

While the reactor herein set forth may be used to effect the electrochemical transformation of various materials, the operation thereof will be set forth in connection with the production of nitric oxide from atmospheric air.

The atmospheric air is dried in an apparatus of the character set forth in Fig. 8, and in the manner herein described. It is then introduced through the inlet member 35 into the sheath member 7, and then passes through the seat member 10 and through the split discharge region present in the reactor. The reaction product passes around the electrode terminals 29, 30 and 31 through the sheath member 23 and leaves the reactor by means of the exit conduit 36.

The air is dried prior to its introduction into the reactor vessel I by passing it through the soda lime tube A, Fig. 8, then through the silica gel tube B. thence through the conduit C, through the orifice D of the differential manometer E, through the valve F, and thence to the reactor I. At the point H is connected the mercury manometer $H_1$ which measures the internal pressure of the reactor. From the reactor I the exit gases pass through exit conduit 36 to a series of silica gel absorber tubes J, which tubes extract the nitric oxide content of the exit gases. A vacuum is applied by means of the vacuum pump K and the amount of vacuum adjusted by means of the release valve L and the main valve F in the supply line. The soda lime functions not only to take out a portion of the moisture but also to extract from the air substantially all of the carbon dioxide. The air as delivered to the reactor I has a moisture content of about 5 to 8 mg. of moisture per liter. When the run is started, the valves N and P are closed and M and O are open. When operation has reached equilibrium, valves N and P are quickly opened and valves M and O closed, noting the time of doing so with a stop-watch. Upon conclusion of the run, valves M and O are opened, while N and P are closed.

The time interval during which the valves N and P are open to the absorbers and the valves M and O of the by-pass are closed is six minutes. During this period the silica gel is absorbing the nitric oxide produced by the reaction. After the run is terminated, the silica gel tubes are weighed and the increase in weight taken as the weight of nitric oxide produced in the six minutes.

In starting the apparatus, the flow of dried air is initiated through the inlet member 35, said air passing through the reactor vessel 1 at the rate of approximately 500 cc. per minute, standard conditions, the pressure within the reactor vessel being maintained at approximately 335 mm. mercury pressure.

During the period that the air is passing through the reactor the electrodes 40 and 43 are connected to a source of low frequency energy, as, for example, a source of alternating current having a frequency of 60 to 500 cycles. During this interval, electrode 9 is connected to a source of high frequency energy, as, for example, 10,000 cycles to 300,000 mc. or over. The high frequency energy passes from the electrode terminals 14, 15 and 16 to the electrode terminals 29, 30 and 31 through the electrodes 25, 26 and 27, and then through the antennas 32, 33 and 34. The electrodes 25, 26 and 27 may properly be called "antenna electrodes." The high frequency current, in passing through the high frequency electrodes and electrode terminals, tends to form distinct discharges between the respective high frequency terminals. These discharges are clearly visible closely adjacent each set of electrode terminals but merge one into the other towards and adjacent the center of the discharge volume. It is clear from the above that there is provided, in accordance with the present invention, an apparatus generating crossed electrical discharges, said discharges being generated by low frequency electrodes which are crossed with a plurality of high frequency electrodes, the low frequency energy and high frequency energy being preferably, but not necessarily, of the order herein set forth. It is desired to point out that the low frequency discharge frequently moves about over the faces of the two button electrodes.

In accordance with the present invention, the use of a plurality of high frequency discharges greatly increases the capacity of a given reactor. In other words, using crossed discharges, the high frequency discharge being unsplit, and other operating conditions remaining the same, the capacity at maximum efficiency of the reactor is limited to the minimum sustaining energy under which the discharge will operate, which minimum usually varies from 12 to 39 watts per pair of high frequency electrode tips, depending upon conditions, and approximating 20 watts for the case under discussion.

It is desired to point out that for any pair of points the energy applied should not exceed the minimum sustaining energy. By this is meant that the product of the volts times the current in amperes should not exceed that value which will just maintain continuous operation of the discharge. It must exceed the value at which the discharges "flutter." Consumption of energy in excess of this amount goes primarily to heat and is thus wasted. Furthermore, the heat thus produced will partially decompose the products formed when using just the sustaining energy. It is for this reason that the capacity of a reactor cannot be increased by merely increasing the energy applied to a single pair of points. It must, rather, be increased by increasing the number of pairs of points, to each of which the minimum sustaining energy may be applied, and this is accomplished by the present invention.

The present invention also functions to increase the electrical energy transfer efficiency from the generator through the tank circuit to the discharge. In general, this energy transfer efficiency is increased from about 1% to 2% for a single pair of points to an efficiency which may be as high as 90%. It is therefore clear that the provision of a reactor in which low frequency electrodes and electrode terminals supplied with low frequency energy are crossed with high frequency electrodes and electrode terminals, one of which is a hot set of electrodes and electrode terminals, and the other of which has its electrodes and electrode terminals connected to antennas, functions to significantly increase the chemical efficiency and production capacity of the reactor and the amount of energy transferred from the generator circuit via the tank circuit to the hot electrode, and therefore significantly decreases power costs.

It is known in the art that by a proper balancing of the reactor load to the generator supply the transfer efficiency from the generator via the tank circuit to the discharge can be increased. Utilizing the apparatus hereinbefore described, in which there are three pairs of high frequency electrodes, the load is more nearly balanced with the generator supply, so that an increase in efficiency could normally be expected of from 1% to 2% to about 5%. However, it has been found that even when using only two pairs of high frequency electrodes and tuning each of the antenna electrodes to maximum transfer efficiency, the energy transfer may be as high as 80%. This compares with the maximum efficiency obtained in the ordinary high frequency dielectric heating devices of between 50% and 60%.

It is desired to point out that increase of the number of pairs of high frequency electrode terminals in one reactor increases the production capacity of the reactor without decreasing its chemical efficiency, i. e., grams of product per kilowatt hour, providing each pair of terminals is operated with no more than the sustaining energy.

More specifically, this increase in the chemical efficiency, the production capacity of the reactor and the transfer efficiency, that is, the transfer of electrical energy from the generator circuit to the reactor, is accomplished by tuning each antenna by means of its variable inductance, the amount of inductance being such as to avoid the formation of a stringy discharge. By a "stringy" discharge is meant a discharge in which the bulk of the luminosity is concentrated along the core. If too many or too little turns are cut in or out of the antenna inductors, then the discharges may become "stringy," or "weak," or "fluttering," and under some circumstances may be entirely extinguished.

It is further desired to point out that a discharge of uniform luminous density usually coincides with a condition of maximum energy transfer from the generator to the discharge. It is to be understood from the above explanation that no hard and fast rule can be given for the amount of inductance which is cut in or out of each antenna 32, 33 and 34, but that, functionally, it should be that amount which will insure the production of a uniformly luminous, non-stringy discharge, while at the same time producing a significant increase in electrical transfer efficiency, which may be as much as 80% to 85%, that is, the electrical transfer efficiency is increased from about 1% to about 80% to 85%.

As shown in Fig. 5, there is provided a reactor which is designated as an entity by the numeral 48, said reactor having interior walls 49. The reactor comprises horizontally extending members or legs 50 and 51 and vertically extending leg members 52 and 53. Positioned within the reactor leg 50 is a sheath member 54 made of glass, said sheath member being mounted in an insulating closure 8. Projecting through the sheath 54 is an electrode 55, carrying a pointed electrode terminal tip 56. The electrode 55 is mounted in an insulating closure member 57, said electrode 55 being connected to an antenna 58 in any suitable manner, as, for example, by a set screw 59. The antenna includes a variable inductance 58a and may, under some conditions, include an antenna tail 58b, the latter being operatively connected to the inductance 58a. In the apparatus set forth in Fig. 5, it was found desirable to insert as part of the antenna an inductance coil 58a. The capacitance of the tank circuit is such as not to require any additional capacitance, but does require inductance in order to provide the necessary impedance, which, in turn, insures maximum efficiency of energy transfer. However, if the tank circuit should lack sufficient capacitance, then this may be supplied by the use of a variable condenser in lieu of or in conjunction with, either in parallel or in series, the variable inductor shown.

Positioned within the leg 51 is a similar electrode 60, having an electrode tip or terminal 61. The electrode 60 is mounted in the closure member 62 which functions to close the exterior end of the sheath 63. The electrode 60 and the sheath 63 is mounted in an end closure 64 which functions to close the exterior end of the leg member 51. The electrode 60 is connected to the antenna 65, which includes an inductance coil 65a, and preferably a tail member 65b.

The leg member 53 is provided with an insulating end closure 66, in which is mounted a sheath member 67, the latter being closed at its exterior end by an insulating closure member 68. Mounted within the latter is an electrode member 69, provided with an electrode terminal or tip 70. The electrode 69 is connected to an antenna 71, which includes an inductance 71a and preferably a tail member 71b. The leg member 52 is provided with an insulating end closure 73, in which is mounted a sheath member 74, the exterior end of the latter being provided with an insulating closure 75. Mounted in the latter and passing through the sheath member 74 is an electrode 76 which is connected to a generator G by means of a lead 77, as shown in Fig. 5 and at 21 in Fig. 10 respectively. The generator is grounded at 78 via tank circuit, said ground being also shown in Fig. 10 at 165. The generator hook-up is shown in Fig. 9, the generator circuit being coupled with the tank circuit set forth in Fig. 10. The sheath member 74 is provided with an inlet member 79, and the sheath member 67 is provided with an outlet member 80.

Operatively connected to the electrode 76 is a plurality of hot electrode terminals 81, 82 and 83, said terminals being preferably connected to the electrode 76 by an intermediate connection member 84, the latter preferably being in the shape of a semi-circular disc member, and positioned within the sheath member to provide gas passages 85, 86, 87 and 88 respectively of Fig. 6. The electrodes 81, 82 and 83 are positioned in the connection member 84 so as to be symmetrically arranged with respect to antenna electrode terminals 56, 70 and 61 respectively. In the preferred form of the invention, the electrode gap between the antenna electrode terminals and the symmetrically placed hot electrode terminals is preferably, although not necessarily, approximately equal. When the electrode terminal gaps are equal, then the tuning of the circuit is facilitated.

While the electrode terminals set forth in Fig. 5, and some of those set forth in Fig. 1, are in the shape of sharp-pointed members, it is desired to point out that it is within the province of the present invention to use buttons, nodules, globules, or to have the electrode terminals in any other shape hitherto used in the treatment or electrochemical transformation of chemical products. However, increased chemical yield is obtained by using pointed electrodes. The sheath members set forth in the form of the apparatus shown in both Figs. 1 and 5 may be omitted, but it is highly desirable to retain them in order to force the flow of gaseous medium being subjected to the action of the electrical discharge or discharges in and around the electrode tips. Further, the sheath members function to a substantial extend to protect the outer reactor vessel from the effect of heat which may be produced during the course of the reaction in the reactor. It is preferred that the electrode terminals project beyond the interior end of the sheath members in order to avoid undue heating, which may induce generation of sodium or other undesirable ions which tend to generate side reactions.

By providing a plurality of electrode terminals 81, 82 and 83 instead of a single electrode terminal, the total power of the hot electrode is divided between a number of points rather than being concentrated all at one point. It is desired to point out that when high frequency energy is supplied to the electrode 76, the remaining electrodes of the reactor shown in Fig. 5 being the antenna electrodes, there is produced a split discharge. In the form of the apparatus shown in Fig. 5, the discharge will be triply split, the potential discharge having been split into discharges X, Y and Z. Using the form of apparatus shown in Fig. 5, the electrical energy transfer efficiency from the generator through the tank circuit to the discharge is increased from approximately 1% to 2% to approximately 80% to 85%.

It is to be noted that in Fig. 5 there is provided a plurality of hot electrode terminals instead of a single electrode terminal. This results in two advantages, namely, increased life of the hot electrode terminals 81, 82 and 83, due to the distribution of the high frequency energy over three electrodes instead of being concentrated on one electrode; and a further advantage may be noted—that the maximum chemical efficiency in terms of grams of product per kilowatt hour of energy supplied is at a maximum when the minimum sustaining energy, that is, the energy to sustain the discharge, which approximates 20 watts for the reactor shown in Fig. 5, is applied to each pair of electrode tips between which the discharges X, Y and Z act. Since there are three hot electrode terminals instead of one, the reactor set forth in Fig. 5 will result in a yield expressed as grams of product per kilowatt hour of energy supplied, appreciably greater than if the three hot terminals were all combined as one terminal.

It is therefore clear that the provision of a split discharge in a high frequency reactor, the hot electrode of which is provided with a plurality of terminals and the other electrodes of which are ground electrodes via antennas, herein designated as "antenna electrodes," functions significantly to increase the amount of energy transferred from the generator circuit via the tank circuit to the hot electrode, and thereby significantly decrease power costs; and, further, the chemical yield and capacity is significantly increased by having a plurality of hot electrode terminals which are preferably, although not necessarily, symmetrically positioned with regard to cooperating antenna electrode terminals.

In Fig. 7 there is shown another form of reactor, employing a high frequency hot electrode and a plurality of antenna electrodes. The reactor comprises a reaction vessel or tube 89 provided with end closures 90 and 91 respectively. Mounted in the end closure 90 is a sheath member 92, which is closed at its rear end by an insulating closure member 93. Mounted in said closure member is a plurality of electrode members 94, 95 and 96 provided respectively with terminal members 97, 98 and 99. The electrodes 94, 95 and 96 are carried at their forward end by an insulating spacer member 100, which is provided with gas passages 101. The electrodes 94, 95 and 96 have connected thereto antennas 102, 103 and 104, said antennas preferably including inductances 102a, 103a and 104a; and in most cases tails 102b, 103b and 104b are provided. Disposed in the reactor tube 89, diametrically opposite sheath 92, is a sheath member 105 mounted in the end closure 91. The sheath 105 is provided with an end closure 106, in which is mounted the hot electrode 107, which seats at its forward end in a seat 108, from which extend three symmetrically arranged stud bolts 109, 110 and 111, on the interior ends of which are screwed electrode tips 112, 113 and 114 of any desired material, as, for example, of an alloy containing 98% copper and 2% lithium, or equivalent materials, hereinafter referred to, the present invention not contemplating that any of the electrodes be made of any specific material. The reactor is provided with an inlet 115 and an exit 116.

The electrode 107 is connected to the generator G by means of a lead 117 shown in Fig. 7 and 21 in Fig. 10. The generator is grounded at 118 via tank circuit, said ground being shown in Fig. 10 at 165. The generator hook-up G is shown in Fig. 9, the generator circuit being coupled with the tank circuit set forth in Fig. 10.

While the reactors herein disclosed may be used in the manufacture of various chemical compounds, it is of particular value in the manufacture of nitric oxide from atmospheric air or air which has been enriched with oxygen. In producing nitric oxide in any of the reactors herein set forth, the air is dried in the apparatus set forth in Fig. 8, the function of said apparatus having been hitherto described.

In an apparatus similar to Fig. 1, using, however, only two pairs of high frequency electrodes and no low frequency electrodes, the rate of flow of the air through the reactor being equal to approximately 470 cc. per minute, standard conditions, and the pressure within the reactor being 730 mm. mercurcy pressure, and with a voltage at the discharge of 1500 volts and 150 milliamperes per pair of points, operating under the conditions above set forth, there is obtained a transfer efficiency of energy transfer equal to 80.4%. It may be pointed out in this connection that the increase in energy transfer increased the watts per pair of points from 20 to 225, and hence did not provide maximum chemical efficiency, so that additional pairs of points are necessary to realize maximum chemical efficiency with 80% transfer efficiency.

In operating reactors of the character herein set forth and equivalent reactors under a voltage of 1500 volts at the discharge and 150 milliamperes per pair of points, the power of each of the discharges is greatly in excess of the power necessary for the greatest chemical efficiency, that is, yield expressed in grams of reacted product per kilowatt hour. Having once made this discovery, the next step was to ascertain a solution of the problem whereby this excess power could be economically and efficiently utilized. This may be accomplished by providing a large plurality of pairs of points. In the particular illustration set forth, two pairs of electrodes were used, each pair of electrodes needing only a power input at the arc of 20 watts. However, each pair of cooperating electrodes was actually supplied with 225 watts, making an excess wattage for each set of electrodes of 205 watts, or a total of the two sets of electrodes of 410 watts. Since, on an average, for best efficiency in electrochemical transformation, each set of electrodes requires about 20 watts, the problem was solved by providing the reactor with 25 pairs of electrodes. In other words, the potential discharge which will be generated by one set of electrodes is split up into 25 discharges. These discharges usually have a separate entity at and adjacent their respective electrode terminals but begin to merge together a short distance from the electrodes to form a continuous luminous medium.

In the above experiment, the hot electrode is supplied with high frequency energy having a frequency of 1.91 mc. (corresponding to 157.1 meters). The reactor set forth in the above experiment is one identical with that set forth in Fig. 5, with the exception that the electrode 60 is removed from the reactor and the closure member 62 is replaced with a solid closure member. Referring to Fig. 5, used in the above experiment, the gap between the electrode terminals 56 and 81 is 27 mm.; the gap between the electrode terminals 82 and 70 is 49 mm. It is desired to point out that the antenna 58 has incorporated therein an inductance 58a, the latter consisting of 438 turns of No. 28 D. C. C. wire wound on a 1¼-inch diameter mandrel plus an Ohmite coil known as No. Z–4. The tail to this antenna consists of 9 feet of No. 18 copper wire.

The antennas 71 included an inductance 71a consisting of 454 turns of No. 28 D. C. C. copper wire wound on a 1¼-inch diameter mandrel plus an Ohmite coil known as Z–3, and further included a tail of 7½ feet of No. 18 copper wire.

In the above example, the electrode terminals 56, 70 and 82 were nickel. The specific discharge gaps are set forth in an illustrative manner and not by way of limitation, it being recognized that the discharge gaps may vary greatly in accordance with predetermined factors, such as the voltage under which the high frequency current is supplied, the frequency of the high frequency energy, the pressure of the air or other gas passing through the reactor, the nature of the gas or fluid which it is desired to electrochemically react, and similar factors.

The following is an additionally illustrative example in which the reactor set forth in Fig. 5 is utilized, said reactor being provided, as shown, with three high frequency hot electrode terminals which respectively cooperated with three antenna electrode terminals. The frequency of the energy supplied to the hot electrode 76 is 1.91 mc. (corresponding to 157.1 meters). Air is passed through the reactor at the rate of about 485 cc. per minute, standard conditions, and the pressure in the reactor is 337 mm. of mercury. The high frequency energy is delivered to the arc under a voltage of 700 volts and an amperage of 100 milliamperes to each of the three pairs of electrodes, namely, 81 and 56; 82 and 70; and 83 and 61. The discharge gaps are as follows: between electrodes 81 and 56 the arc gap is 33 mm.; between electrodes 82 and 70, the discharge gap is 27 mm.; and between electrode terminals 83 and 61, the discharge gap is 16 mm. These discharge gaps are deliberately varied in order to obtain results under different operating conditions.

The antenna 58 has present an inductance coil 58a consisting of 438 turns of No. 28 D. C. C. copper wire close-wound on a 1¼-inch mandrel, plus an Ohmite coil No. Z-4, and further has a tail of 9 feet of No. 18 copper wire. The inductance 71a of the antenna 71 consists of 436 turns of No. 28 D. C. C. copper wire close-wound on a 1¼-inch mandrel, plus an Ohmite coil of the Z-4 type, plus a 10-foot tail of No. 18 copper wire.

The antenna 65 included an inductance 65a which consisted of 454 turns of No. 28 D. C. C. copper wire close-wound on a 1¼-inch mandrel, plus two Ohmite coils, type Z-3, plus a 7½-foot tail of No. 18 copper wire.

In the above experiment, the electrical transfer efficiency is only 39%, because time was not taken to accurately tune each of the antenna electrodes. When the optimum inductance is placed in each respective antenna, then optimum electrical transfer efficiency is obtained. In other words, the transfer efficiency may vary from 40 to 80–85% or 90%, the latter figures representing the optimum transfer efficiency.

It is desired to point out that the amount of inductance which each antenna carries is such as to give what may be termed a "fat" discharge, that is, a discharge which is not a "stringy" discharge — mostly core. For example, the arcs X, Y and Z of Fig. 5 are maintained in a bulged-out state, such as shown in Fig. 5, this being accomplished by cutting in or out in the respective antennas' induction turns. If too many or too little turns are cut in or out of the antenna, then the discharge may become what is known as a "stringy" or "fluttering" discharge, and the discharge may, under some circumstances, be entirely extinguished. It is to be understood from the above explanation that no hard and fast rule can be given for the amount of inductance which is cut in or out of each antenna, but that, functionally, it should be that amount which will in an apparatus of the character of Fig. 5 provide a fat discharge, or, in some of the other apparatus, produce discharges which give optimum transfer efficiencies.

As shown in Fig. 1, the gaseous material is subjected to a plurality of crossed electrical discharges, one of said discharges being of the order of 2 mc. and the other being of the order of 60 cycles; or radio frequency energy may be crossed with radio frequency energy, as, for example, 2 mc. frequency crossed with 2 mc. frequency; or high frequency energy having peak bands may be crossed with similar high frequency having peak bands; or energy of a much lower frequency having peak bands. In all of these cases, the electrical transfer energy is greatly increased by providing a plurality of pairs of electrode points with properly tuned antennas, as hereinbefore described.

While the present invention has been set forth in connection with the production of nitric oxide, it may be applied to effect a number of chemical reactions, including chemical combination, polymerization, dehydrogenation, oxidation, and the like. Organic compounds, such as aliphatic, aromatic, or cyclic hydrocarbons, aldehydes, ketones, alcohols, esters and acids, as well as nitrogen, sulphur, halogen, or other substitution products and derivatives thereof, may be treated in accordance with the principle of the present invention to effect chemical combination, splitting or breaking down, transformation from saturated to unsaturated compounds, or vice versa, hydrogenation, dehydrogenation, and many other chemical reactions.

The present invention may be used for the production of aldehydes, such as formaldehyde, for the oxidation of sulphur dioxide to sulphur trioxide, for the condensation of ammonia to hydrazine, the oxidation of benzene to phenol, and the like.

While it has been stated that the electrode terminals or tips are made of nickel, it is within the province of the present invention to employ other electrode materials, such as copper, brass, tantalum, silver, iron, chomium, nickel chromium alloys, nickel alloys, platinum alloys, columbium, thorium, and the like. Carbon electrodes may be used. Any or all of the electrode terminals may be made of a copper lithium alloy, as, for example, 98% copper with 2% lithium.

The hot electrode terminal may be made of a metal or alloy having a different ion emission potential from the antenna electrodes. It is within the province of the present invention to make the electrodes and electrode tips of different conducting metals or alloys, so as to provide electrode tips each chosen to have its own selective ion emission potential.

Fig. 9 sets forth the hook-up of the high frequency generator unit used for producing the high frequency energy supplied to the tank circuit connecting the generator to the reactor. The diagram may be divided into four circuits, 119, 120, 121 and 122. Circuit 119 is the full wave rectification unit wherein the leads 123 connect to the 110-volt 60-cycle supply on the panel board. The numeral 124 identifies a transformer delivering its secondary high voltage current to the two rectification tubes 125, the filaments of which are heated by current generated in the filament transformer 126. The resistor 128 and fixed condenser 129, together with the choke coil 127, constitute a filter. The high voltage D. C. current produced by this circuit leaves same by means of the ground connection 130 and the lead 131, which delivers to the plate of tubes 132 and 133 of the oscillator circuit. The transformer 134, connected with a 110-volt supply, provides the filament power for the tubes 132 and 133. The desired frequency is obtained by means of tuning the oscillator circuit 120, such tuning being effected by operation of the variable condenser 135 and the inductance 136.

In carrying out the work described as above set forth between the limits of wave length of 20 meters or 15 mc. and 175 meters or 1.71 mc., it is necessary to change the size of the inductance 136 by steps. This is done by removing one inductance and replacing same with another inductance having the desired characteristics. The minor circuit 137 is a coupling circuit, coupling the oscillator circuit 120 to the grid input circuit 138 of the power amplifier circuit 121. The grid circuit of the power amplifier is tuned by means of the variable condenser 139 and by changing inductance coils 138 in a manner similar to the change effected in inductance 136, as necessary to meet requirements. The combination of resistor 140 and condenser 141, both of which are grounded, serves to minimize or eliminate parasitic oscillations that might render the output less monochromatic. The resistor 142 provides grid bias for the power amplifier tubes 143 and 144. Transformer 145 provides power for the filaments of the power tubes 143 and 144. These tubes amplify power provided by circuit 122, imparting thereto the frequency developed by oscillator tubes 132 and 133. Transformer 146, connected with a 110-volt supply, provides the energy to the power supply rectification tubes 147 and 148. Transformer 149, also connected with a 110-volt supply, provides the power for the filaments of tubes 147 and 148. It will be observed that circuit 122 is essentially similar to circuit 119. The combination of the choke 150, fixed condenser 151, and resistor 152 constitutes a filter. The rectified power leaves the circuit via the milliammeter 153 to ground and lead 154 to the power amplifier circuit 121. The voltage at which it is delivered is measured by the voltmeter 155.

The power amplifier circuit 121 is tuned to the desired frequency is generated by means of oscillator tubes 132 and 133 of oscillator circuit 120 by means of the variable condenser 156 and the inductance 157. The inductance 157 is varied by means of changing coils to meet various wave length requirements as is done in the case of inductances 136 and 138. The power amplifier circuit 121 thus tuned and supplied by D. C. power from circuit 122 transmits the amplified high frequency energy to the coupling circuit 158, which in turn delivers it to a tank circuit such as is shown in Fig. 10.

Fig. 10 represents a tank circuit of the type known as "end grounded." The coupling circuit 159, Fig. 10, is part of the same circuit 158 shown in Fig. 9. It is placed at the end of the inductance 160 instead of in the middle, as would be the case if it were center grounded. The point 161 is the location of the hot electrode of the discharge, while 32, 33 and 34 (Figs. 1 and 10) show the location of the antenna electrodes. Tuning of this tank circuit is accomplished by means of the variable condenser 162 and by changing the inductance 160 to meet requirements. The circuit conductors 163 are preferably of copper tubing. The high frequency voltmeter is shown at 164, and it will be noted that it has a ground terminal 165 which is also the ground terminal for the inductor 160. The hot electrode 9 of Fig. 1 and 161 of Fig. 10 connect into the tank circuit by means of conductor 21 (Figs. 1 and 10). This tank circuit was used in carrying out both of the examples hereinbefore set forth.

In employing reactors of the type herein set forth, the production capacity is greatly increased. When employing a reactor typified by that set forth in Fig. 7, the increase in capacity is approximately in direct proportion to the increase in number of pairs of electrodes, it being pointed out that each set of electrodes comprises a primary hot electrode terminal and a corresponding secondary or antenna electrode terminal. If the capacity of the reactor of Fig. 7 is 3 grams per hour for each set or pair of electrodes, then the total capacity of the reactor, as shown, is approximately 9 grams per hour. It is within the province of the present invention to provide a reactor of the type shown in Fig. 7, but wherein, instead of 3 pairs of primary and secondary electrodes, there are provided 100 pairs of primary and secondary electrodes, each pair of said electrodes comprising a hot electrode and an antenna electrode. Such a reactor will have a capacity per hour of 300 grams.

As pointed out, the basic discoveries herein set forth may be incorporated in a reactor employing the principle of crossed discharges. In connection therewith, it may be pointed out that if the reactor of Fig. 7 is operated with one pair of high frequency electrodes there will be a given output per hour. If the electrodes of said reactor are crossed with low frequency electrodes, as set forth in said copending application Serial No. 546,882, filed July 27, 1944, Electrochemical transformation of gaseous material, a continuation-in-part of application Serial No. 483,931, now abandoned, and atmospheric air or equivalent material is electrically transformed to produce nitric acid, then there results an increase in chemical yield of nitric acid per kilowatt hour which is greater than the sum of the yield per kilowatt hour produced by passing air through a reactor having high frequency electrodes carrying the same high frequency; and the yield per kilowatt hour produced by passing air through a reactor having the same low frequency energy passing through its electrodes as passed through the low frequency electrodes of the reactor provided with crossed electrodes. This increase in chemical yield is characteristic of a crossed discharge reactor such as set forth in Example I, and simultaneously with this increase in chemical yield so characteristic of crossed discharges, as particularly pointed out in said copending application, there is a tremendous increase in capacity, this being due to the provision of a plurality of pairs of high frequency electrodes.

In the production of nitric oxide and, in general, in the electrochemical transformation of materials, it is within the province of the present invention to carry out the reaction under a vacuum, or at atmospheric pressure, or at super-atmospheric pressure.

The present invention, while specifically adapted for the production of nitric oxide, may be used for the electrochemical transformation of many different chemical entities. Nitric oxide may be produced by passing through the reactor a nitrogen- and oxygen-containing medium in which the nitrogen and oxygen gases are present in various proportions, and includes air, which is a naturally-occurring mixture of oxygen and nitrogen gases, or a synthetic mixture containing nitrogen gas and oxygen gas. Each of said mixtures may have present a diluent gas, some of which assists in promoting the reaction so as to produce nitrogen oxides, as, for example, nitric oxide, said diluent gas preferably being an inert gas, as, for example, helium, neon, and the like.

The present invention provides for increased production capacity of the reactor, increased chemical yield per kilowatt hour, longer life of the hot electrode terminals, and a unique reactor embodying the principles herein set forth. The invention also consists in the crossed discharge reactor embodying the above improvements.

By distributing the energy of the hot electrode over a plurality of terminals or points, there results a lower temperature of the points when the latter are in use, and therefore a longer life of the terminals or points, and a wider choice of terminal materials. With a plurality of pairs or sets of cooperating electrode terminals or points, as shown in Fig. 7, or as in Fig. 1, where a crossed discharge apparatus is set forth, it is possible to operate at just the sustaining electrical energy for each pair of electrode terminals, or points, when said terminals are in point form, to thereby provide an increased yield of product per kilowatt hour. Further, by collecting all of the antenna electrodes into the leg of the reactor opposite to the hot electrode terminals, the principle of split discharge can be utilized in a crossed discharge apparatus, as shown in Fig. 1. Further, in accordance with the present invention, a crossed discharge reactor can be provided with antenna electrodes in the leg of the reactor opposite the hot electrode leg to provide a compact and efficient reactor, the capacity of which is much greater than a similar crossed discharge reactor which is not provided with a plurality of antenna electrodes.

Broadly, the method and apparatus for increasing the electrical transfer and chemical efficiency and production capacity by employing split discharges and antenna electrodes is the invention of Earl T. Denton and is broadly claimed in application Serial No. 497,676, filed August 6, 1943.

By "radio frequency" as used above is meant a frequency ranging from 300,000 cycles to 600 mc. and more, usually 500,000 cycles to 60 mc.

By "radar frequency" as used above is meant a frequency ranging from 30 mc. to 30,000 mc. and more, usually a frequency from 60 mc. to 3,000 mc.

The term "hot electrode" as used in the specification defines the high potential electrode; and the term "cold electrode" or equivalent terminology defines the low potential electrode.

What is claimed is:

1. In an electrochemical apparatus for effecting the electrochemical transformation of gaseous material, the combination of a source of cyclic energy having a frequency of over 500,000 cycles, and a reactor comprising a reactor chamber, means to therein introduce reacting material, means to remove transformed material from said reactor chamber, a primary high potential electrode in said chamber connected to said source of cyclic energy, said electrode being provided with a plurality of electrode terminals distributing cyclic electrical energy supplied to said electrode to thereby increase the working life of the reactor and simultaneously increase the chemical efficiency of the reactor, a plurality of secondary electrodes in said reactor chamber each thereof being provided with a secondary electrode terminal, said assemblage providing a plurality of pairs of electrode terminals, each of said secondary cooperating electrodes being separately connected to a separate antenna in circuit with said source of cyclic electrical energy to thereby insure transfer of electrical energy from the source of said energy to the reactor with relatively low transfer loss, and means to tune each antenna.

2. In an electrochemical apparatus for effecting the electrochemical transformation of gaseous material, the combination of a source of cyclic energy having a frequency of at least 300,000 cycles, and a reactor comprising a reactor chamber, a sheath member therein, means connected to said sheath member to introduce reacting material into the reactor chamber, a primary high potential electrode mounted in said sheath member and connected to said source of cyclic energy, said electrode being provided with a plurality of electrode terminals distributing cyclic energy supplied to said electrode to thereby increase the working life of the reactor and simultaneously increase the chemical efficiency of the reactor, a second sheath member mounted in said reactor chamber, means connected to said sheath member for removing reaction products from the reactor chamber, a plurality of secondary electrodes mounted in said second sheath member, each of said electrodes being provided with a secondary electrode terminal, said assemblage providing a plurality of pairs of electrode terminals, an antenna member separately connected to each of said secondary cooperating electrodes, and means to tune each antenna each of the latter being in circuit with said source of cyclic electrical energy to thereby insure transfer of electrical energy from the source of said energy to the reactor with relatively low transfer loss.

3. The method of effecting the electrochemical transformation of a gaseous material in a reactor comprising a reactor chamber, a high potential electrode therein provided with a plurality of high potential electrode terminals and a plurality of cooperating low potential electrodes and electrode terminals, said low potential units being separately spaced from each other and electrically independent of each other, said assemblage of electrodes and terminals being adapted to have luminous electrical discharges pass therebetween, comprising effecting said transformation in the presence of a luminous discharge and with little heat decomposition of the transformed product while prolonging the working life of the electrode terminals by supplying to said high potential electrode high frequency energy having a frequency of over 300,000 cycles, distributing the cyclic energy supplied to said high potential electrode to said high potential electrode terminals and passing the so-distributed energy to a plurality of separately spaced low potential electrodes and low potential electrode terminal units, each unit being electrically independent of each other unit, and separately tuning each of said independent low potential electrode units.

4. In an electrochemical apparatus for effecting the electrochemical transformation of gaseous material in the presence of a luminous cyclic electrical discharge, the combination of a source of cyclic energy, comprising a reactor chamber, means to therein introduce reacting material, means to remove reaction products from said chamber, a primary high potential electrode in said reactor chamber connected to said source of cyclic energy, said electrode being provided with a plurality of electrode terminals distributing cyclic electrical energy supplied to said electrode to thereby increase the working life of the reactor, a plurality of secondary low potential electrodes in said reactor chamber, each electrode thereof being provided with a secondary low potential electrode terminal, said assemblage providing a plurality of pairs of electrode terminals, each of said secondary cooperating electrodes being separately connected to a separate antenna including tuning means in circuit with said source of cyclic electrical energy to thereby insure transfer of electrical energy from the source of said energy to the reactor with relatively low transfer loss, and means for producing a cyclic electrical discharge crossing the luminous cyclic discharge generated by the primary high potential electrode terminals and secondary low potential electrode terminals.

5. In a gas discharge apparatus for effecting the electrochemical transformation of gaseous material in the presence of a luminous cyclic electrical discharge, the combination of an electrical circuit furnishing cyclic electrical energy, a reactor chamber, means for introducing gaseous material therein, means for removing transformed material therefrom, a primary high potential electrode in said reactor chamber connected in said electrical circuit and receiving cyclic energy and having a plurality of electrode terminals spaced from each other whereby the electrical energy supplied to the high potential primary electrode is distributed to said electrode terminals, a plurality of tuneable low potential cooperating secondary electrodes and electrode terminal units in said reactor chamber separately spaced from each other and from the high potential primary electrode terminals, each of said low potential units being electrically independent of each other, and means including means to tune said low potential electrode units to cause luminous discharges to be initiated and maintained between said high potential primary electrode terminals and the secondary low potential electrode terminals.

6. In a gas discharge apparatus for effecting the electrochemical transformation of gaseous material in the presence of a luminous cyclic electrical discharge, the combination of an electrical circuit furnishing cyclic electrical energy, a reactor chamber, means for introducing gaseous material therein, means for removing transformed material therefrom, a primary high potential electrode in said reactor chamber connected in said electrical circuit and receiving cyclic energy and having a plurality of electrode terminals spaced from each other whereby the electrical energy supplied to the high potential primary electrode is distributed to said electrode terminals, a plurality of low potential cooperating secondary electrode terminals in said reactor chamber separately spaced from each other and from the high potential primary electrode terminals, an antenna connected to each of said separately spaced low potential electrodes, the latter and each antenna being in circuit with the source of cyclic electrical energy, and means to tune each antenna and thereby cause luminous electrical discharge to be initiated and maintained between said high potential primary electrode terminals and the secondary low potential electrode terminals.

7. In a gas discharge apparatus for effecting the electrochemical transformation of gaseous material in the presence of a luminous cyclic electrical discharge, the combination of a generator unit furnishing cyclic electrical energy, said generator unit being coupled to a tank circuit containing a reactor having a reactor chamber, means for introducing gaseous material therein, means for removing transformed material therefrom, a primary high potential electrode in said reactor chamber connected in said electrical circuit and receiving cyclic energy and having a plurality of electrode terminals spaced from each other whereby the electrical energy supplied to the high potential primary electrode is distributed to said electrode terminals, a plurality of tuneable low potential cooperating secondary electrode and electrode terminal units in said reactor chamber separately spaced from each other and from the high potential primary electrode terminals, each of said low potential units being electrically independent of each other, means in the tank circuit to effect tuning of said low potential electrode units and cause luminous discharges to be initiated and maintained between said high potential primary electrode terminals and the secondary low potential electrode terminals.

8. In a gas discharge apparatus for effecting the electrochemical transformation of gaseous material in the presence of a luminous cyclic electrical discharge, the combination of a generator unit furnishing cyclic electrical energy, said generator unit being coupled to a tank circuit containing a reactor having a reactor chamber, means for introducing gaseous material therein, means for removing transformed material therefrom, a primary high potential electrode in said reactor chamber connected in said electrical circuit and receiving cyclic energy and having a plurality of electrode terminals spaced from each other whereby the electrical energy supplied to the high potential primary electrode is distributed to said electrode terminals, a plurality of low potential cooperating secondary electrode terminals in said reactor chamber separately spaced from each other and from the high potential primary electrode terminals, an antenna connected to each of said separately spaced low potential electrodes, the latter, the antennae and the high potential electrode terminals being part of the tank circuit, and means to tune each antenna and thereby cause luminous electrical discharges to be initiated and maintained between said high potential primary electrode terminals and low potential secondary electrode terminals.

9. In a gas discharge apparatus for effecting the electrochemical transformation of gaseous material in the presence of a luminous cyclic electrical discharge, the combination of an electrical circuit furnishing cyclic electrical energy, a reactor chamber, means for introducing gaseous material therein, means for removing transformed material therefrom, a primary high potential electrode in said reactor chamber connected in said electrical circuit and receiving cyclic energy and having a plurality of electrode terminals spaced from each other whereby the electrical energy supplied to the high potential primary electrode is distribtued to said electrode terminals, a plurality of low potential cooperating secondary electrode terminals in said reactor chamber separately spaced from each other and from the high potential primary electrode terminals, means including means to tune said electrical circuit to cause luminous discharges to be initiated and maintained between said high potential primary electrode terminals and the secondary low potential electrode terminals, and means for producing a cyclic electrical discharge crossing the luminous cyclic electrical discharge generated by the high potential primary electrode terminals and the secondary low potential electrode terminals.

10. In a gas discharge apparatus for effecting the electrochemical transformation of gaseous material in the presence of a luminous cyclic electrical discharge, the combination of an electrical circuit furnishing cyclic electrical energy, a reactor chamber, means for introducing gaseous material therein, means for removing transformed material therefrom, a primary high potential electrode in said reactor chamber connected in said electrical circuit and receiving cyclic energy and having a plurality of electrode terminals spaced from each other whereby the electrical energy supplied to the high potential primary electrode is distributed to said electrode terminals, a plurality of low potential cooperating secondary electrode terminals in said reactor chamber separately spaced from each other and from the high potential primary electrode terminals, an antenna connected to each of said separately spaced low potential electrodes, the latter and each antenna being in circuit with the source of cyclic electrical energy, means to tune each antenna and thereby cause luminous electrical discharges to be initiated and maintained between said high potential primary electrode terminals and the secondary low potential electrode terminals, and means for producing a cyclic electrical discharge crossing the luminous cyclic electrical discharge generated by the high potential primary electrode terminals and the secondary low potential electrode terminals.

11. In a gas discharge apparatus for effecting the electrochemical transformation of gaseous material in the presence of a luminous cyclic electrical discharge, the combination of a generator unit furnishing cyclic energy of a frequency of at least 10,000 cycles per second, said generator unit being coupled to a tank circuit containing a reactor having a reactor chamber, means for introducing gaseous material therein, means for removing transformed material therefrom, a primary high potential electrode in said reactor chamber connected in said electrical circuit and receiving cyclic energy and having a plurality of electrode terminals spaced from each other whereby the electrical energy supplied to the high potential primary electrode is distributed to said electrode terminals, a plurality of low potential cooperating secondary electrode terminals in said reactor chamber separately spaced from each other and from the high potential primary electrode terminals, means in the tank circuit to effect tuning and cause luminous discharges to be initiated and maintained between said high potential primary electrode terminals and the secondary low potential electrode terminals, and means for producing a cyclic electrical discharge crossing the luminous cyclic electrical discharge generated by the high potential primary electrode terminals and the secondary low potential electrode terminals.

12. In a gas discharge apparatus for effecting the electrochemical transformation of gaseous material in the presence of a luminous cyclic electrical discharge, the combination of a generator unit furnishing cyclic energy of a frequency of at least 10,000 cycles per second, said generator unit being coupled to a tank circuit containing a reactor having a reactor chamber, means for introducing gaseous material therein, means for removing transformed material therefrom, a primary high potential electrode in said reactor chamber connected in said electrical circuit and receiving cyclic energy and having a plurality of electrode terminals spaced from each whereby the electrical energy supplied to the high potential primary electrode is distributed to said electrode terminals, a plurality of low potential cooperating secondary electrode terminals in said reactor chamber separately spaced from each other and from the high potential primary electrode terminals, an antenna connected to each of said separately spaced low potential electrodes, the latter, the antennae and the high potential electrode terminals being part of the tank circuit, means to tune each antenna and thereby cause luminous electrical discharges to be initiated and maintained between said high potential primary electrode terminals and the low potential secondary electrode terminals, and means for producing a cyclic electrical discharge crossing the luminous cyclic electrical discharge generated by the high potential primary electrode terminals and the secondary low potential electrode terminals.

13. The method of effecting the electrochemical transformation of a gaseous material in a gas discharge reactor comprising a reactor chamber, a high potential primary electrode therein provided with a plurality of primary electrode terminals and a plurality of separately spaced tuneable cooperating low potential secondary electrode and electrode terminal units therein, said low potential electrode and electrode terminal units being electrically independent of one another, said assemblage of electrodes and terminals being adapted to have a luminous electrical discharge pass from each primary high potential electrode terminal to its cooperating secondary low potential electrode terminal, comprising effecting said transformation with little heat decomposition of the transformed product by supplying cyclic electrical energy to said high potential electrode, distributing said energy to said plurality of high potential electrode terminals, and passing the so-supplied energy to a plurality of separately spaced low potential electrode and low potential electrode terminal units, each unit being electrically independent of each other and separately tuning each of said independent low potential electrode units.

14. The method of effecting the electrochemical transformation of a gaseous material in a gas discharge reactor constituting a portion of a plurality of electric circuits, said reactor comprising a reactor chamber, a high potential primary electrode therein provided with a plurality of primary electrode terminals and a plurality of separately spaced tuneable cooperating low potential secondary electrode and electrode terminal units therein, said low potential electrode and electrode terminal units being electrically independent of one another, said assemblage of electrodes and terminals being adapted to have a luminous electrical discharge pass from each primary high potential electrode terminal to its cooperating secondary low potential electrode terminal, comprising effecting said transformation in the presence of a luminous discharge with little heat decomposition of the transformed product while prolonging the working life of the electrode terminals by supplying to said high potential electrode electrical energy having a frequency of at least 10,000 cycles per second, passing the so-supplied energy to a plurality of low potential electrode and low potential terminal units, each of said units being electrically independent of each other, and tuning the electrical circuits to initiate and maintain luminous electrical discharges between said primary high potential electrode terminals and their low potential cooperating electrode terminals.

15. In a gas discharge apparatus for effecting the electrochemical transformation of gaseous material in the presence of a luminous cyclic electrical discharge, the combination of a generator unit furnishing cyclic energy of a frequency of at least 10,000 cycles per second, said generator unit being coupled to a tank circuit containing a reactor having a reactor chamber, means for introducing gaseous material therein, means for removing transformed material therefrom, a primary high potential electrode in said reactor chamber connected in said electrical circuit and receiving cyclic energy and having a plurality of electrode terminals spaced from each other whereby the electrical energy supplied to the high potential primary electrode is distributed to said electrode terminals, a plurality of low potential cooperating secondary electrode terminals in said reactor chamber separately spaced from each other and from the high potential primary electrode terminals, and means in the tank circuit to effect tuning and cause luminous discharges to be initiated and maintained between said high potential primary electrode terminals and the secondary low potential electrode terminals.

16. In a gas discharge apparatus for effecting the electrochemical transformation of gaseous material in the presence of a luminous cyclic electrical discharge, the combination of a generator unit furnishing cyclic energy of a frequency of at least 10,000 cycles per second, said generator unit being coupled to a tank circuit containing a reactor having a reactor chamber, means for introducing gaseous material therein, means for removing transformed material therefrom, a primary high potential electrode in said reactor chamber connected in said electrical circuit and receiving cyclic energy and having a plurality of electrode terminals spaced from each other whereby the electrical energy supplied to the high potential primary electrode is distributed to said electrode terminals, a plurality of low potential cooperating secondary electrode terminals in said reactor chamber separately spaced from each other and from the high potential primary electrode terminals, and means for tuning each of the discharges between said electrode terminals within the tank circuit to increase the energy transfer efficiency.

WILLIAM J. COTTON.

REFERENCES CITED

The following references are of record in the file of this patent:

UNITED STATES PATENTS

| Number | Name | Date |
|---|---|---|
| 546,702 | Koneman | Sept. 24, 1895 |
| 659,926 | Jacobs | Oct. 26, 1900 |
| 908,297 | Martini | Dec. 29, 1908 |
| 1,055,331 | Kochmann | Mar. 11, 1913 |
| 1,280,471 | Hoofnagle | Oct. 1, 1918 |
| 1,376,180 | Wickersham | Apr. 26, 1921 |
| 1,615,645 | Nyman | Jan. 25, 1927 |
| 1,673,654 | Weed | June 12, 1928 |
| 1,912,499 | Jakosky et al. | Jan. 29, 1935 |
| 1,989,499 | Sabot | Jan. 29, 1935 |
| 2,043,422 | Bergk et al. | June 9, 1936 |
| 2,064,260 | Hermann | Dec. 15, 1936 |
| 2,080,930 | Rose | May 18, 1937 |
| 2,106,780 | Whittier | Feb. 1, 1938 |

FOREIGN PATENTS

| Number | Country | Date |
|---|---|---|
| 67,583 | Switzerland | Dec. 3, 1913 |

OTHER REFERENCES

Comptes Rendus de l'Academie des Sciences de l'U. R. S. S., vol. 18 (1938), page 329.